Patented July 15, 1952

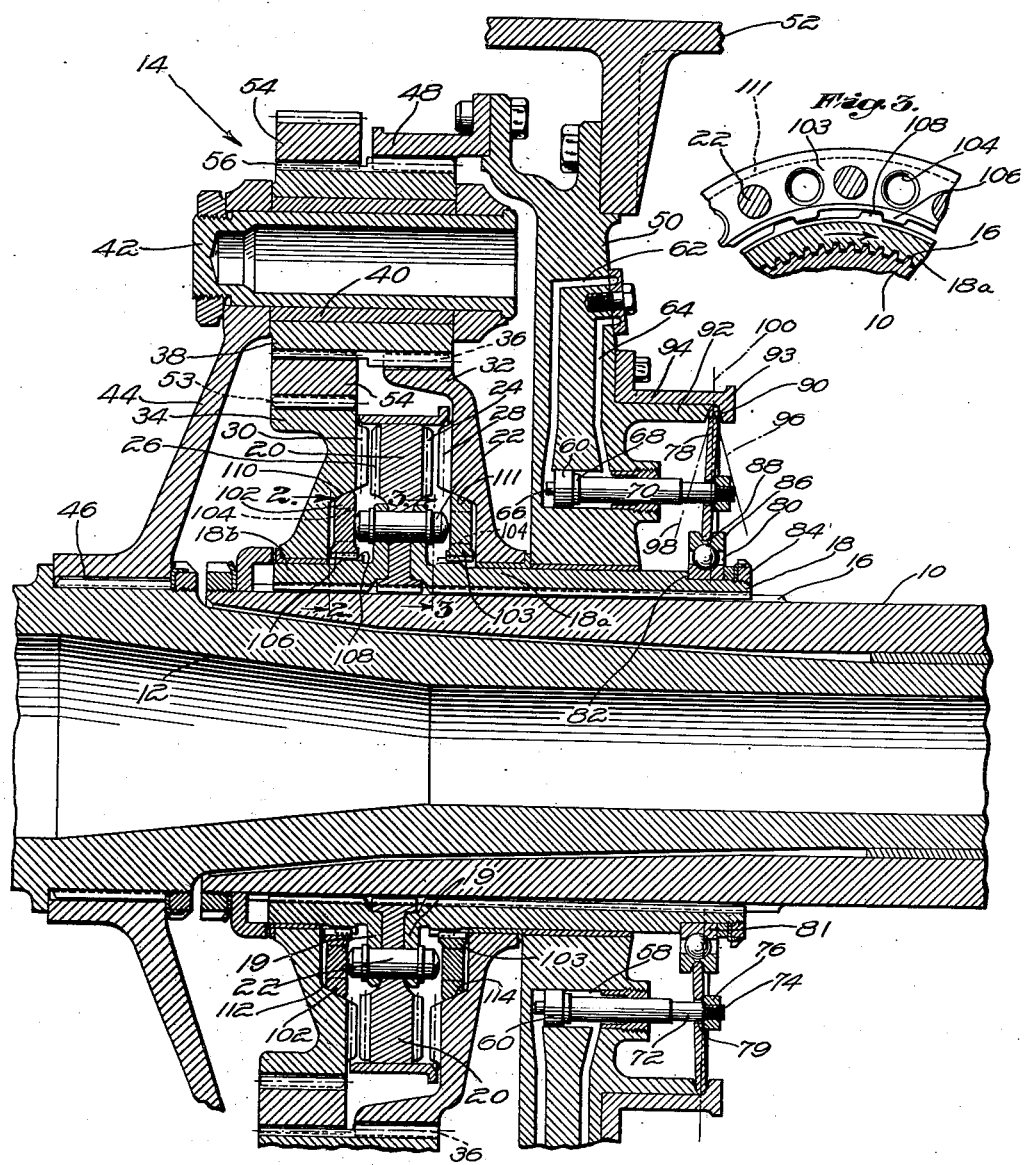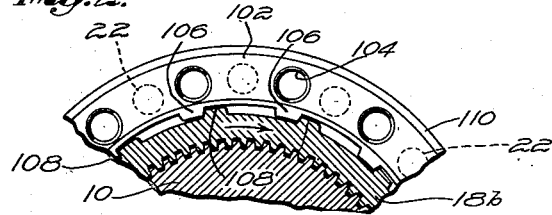

2,603,327

UNITED STATES PATENT OFFICE 2,603,327

SNAP ACTUATOR FOR CLUTCHES

Alexander H. King, West Hartford, Conn., assignor to United Aircraft Corporation, East Hartford, Conn., a corporation of Delaware Application December 14, 1944, Serial No. 568,099

4 Claims. (Cl. 192—86)

This invention relates to improvements in multi-speed reduction gearing for aircraft propeller drives, and has for one of its objects the provision of a two-speed gearing in which the shift from either gear ratio to the other can be made while the propeller and the engine are turning at high speed.

Another and more specific object of the invention is the provision of a two speed gearing for an aircraft propeller drive in which the shiftable member is moved by improved operating means from a neutral position into either of its operative positions with a snap action.

A still further object of the invention is to provide such an improved operating means in which the shiftable member can move to its operative positions with a snap action free from restraint by the means for initially actuating it.

A yet further object of the invention is to provide such a snap acting actuating mechanism for the shiftable member of a two speed gearing having means controlled by changes in relative rotation of the engageable elements for controlling the action of said mechanism.

Other objects and advantages of the invention will be apparent from the following description of a preferred embodiment thereof.

In the drawings,

Fig. 1 is a sectional view through a two speed gearing embodying the invention.

Fig. 2 is a view taken on line 2—2 of Fig. 1 when shifting from high to low gear, and Fig. 3 is a view taken on line 3—3 of Fig. 1 when shifting from low to high gear.

As herein shown, 10 designates an engine driven shaft which may be the crankshaft, or an extension thereof, which drives a propeller driving shaft 12 concentric therewith through a two speed planetary gear mechanism generally indicated at 14.

Shaft 10 has splines 16 at its free end and carries a correspondingly splined sleeve 18 which is free to slide along the splines 16. Sleeve 18 is made in two parts 18a and 18b having a driving dog clutch member 20 fixed therebetween, constituting the shiftable member of the gearing. The member 20 is fixed to parallel flanges 19 of the sleeve by a plurality of upset plungers, or pins, 22 equally spaced about the web of member 20. The shiftable member 20 has clutch teeth, or splines, 24 and 26 on its opposite lateral faces which may be meshed with similar clutch teeth 28 and 30, respectively, on the confronting lateral faces of a large diameter sun gear 32 and a small diameter sun gear 34 both of which are journalled for free rotation on the sleeve 18, each on a different part of the sleeve and on opposite sides of the shiftable driving member 20. Sun gear 32 has spur teeth 36 which mesh with planet pinions 38, a plurality of which are rotatably supported on bushings 40 on pins 42 carried by a spider 44 which is splined at 46 to shaft 12. The pinions 38 also mesh with a ring gear 48 which is fixed to an inwardly directed web, or partition 50, attached to the engine crankcase 52. The above parts constitute the high speed drive between the shaft 10 and shaft 12 when the teeth 24 of the shiftable member 20 are engaged with the teeth 28 of sun gear 32.

The spur teeth 53 of the smaller sun gear 34 mesh with the teeth of pinion rings 54 which are internally splined at 56 to the planet pinions 38 and increase the diameter of these pinions sufficiently to accommodate them to the smaller diameter of sun gear 34. This structure, in conjunction with parts of the high speed gear drive already described, comprises the low speed drive between shafts 10 and 12 when the teeth 26 of shiftable member 20 are meshed with the teeth 30 of sun gear 34.

The web 50 is of sufficient thickness to accommodate a plurality of horizontally disposed hydraulic cylinders 58 formed therein which are disposed peripherally about the sleeve 18 adjacent the inner peripheral portion of the web. Pistons 60 are reciprocable in cylinders 58 in response to pressure of fluid supplied through passages 62 and 64 to opposite ends of the pistons. It will be understood that suitable manually operable control means, not shown, controls the admission of fluid to one or the other of said passages for initiating the movement of member 20 between its two operative positions in which it is engaged with either sun gear 32 or sun gear 34. The pistons 60 have stop means 66 and 68 at opposite ends thereof which engage the ends of the cylinders and prevents the pistons from closing off passages 62 and 64, so that these pistons are always ready to operate in one direction or the other upon admission of fluid through one of the passages and bleeding of the other passage. The pistons 60 have piston rods 70 having intermediate reduced portions 72 and still further reduced threaded end portions 74 on which nuts 76 are screw threaded.

The piston rods 70 are operatively connected with the sleeve 18 by a Belleville spring, or conical washer, 78 which surrounds the sleeve 18 and has an annular series of apertures 79 between its inner and outer peripheries in which the intermediate piston portions 72 are loosely received. As is well known, such a conical washer when formed of suitable resilient metal is very unstable in its intermediate flat position in which the material comprising it is highly stressed, and will move with a snap action to either of its opposite conical positions in which it is relaxed. The Belleville washer has its inner periphery operatively connected with sleeve 18 by means of a ball bearing 80 the inner race 81 of which is fixed to the sleeve against longitudinal movement between a shoulder 82 and a ring nut 84. The outer race 86 of bearing 80 is provided with an annular groove 88 in which the inner periphery of the Belleville spring is pivotally seated, this groove being suitably relieved laterally to permit flexing of the washer within its limits of flexure while seated therein. A similar groove 90 is provided to receive and fixedly pivotally support the outer periphery of the washer, this groove being formed between the end wall of a fixed abutment 92 and the confronting flange 93 of a removable sleeve member 94 between which the extreme outer periphery of the spring is supported against axial movement. This groove is likewise laterally relieved to permit flexing of the washer between its opposite conical positions which are indicated by the dot and dash lines 96 and 98.

It will be noted that the intermediate portions 72 of the piston rods 70 which are received in the apertures 79 in the Belleville spring are of such length that the movement of the pistons 60 in either direction will move the Belleville spring through and slightly beyond its neutral position. For example, as shown in Fig. 1 the pistons have moved to the left, during which movement the Belleville spring has been engaged by nuts 76 and moved from its normal righthand position through and slightly to the left of its flat, or neutral position indicated by the dot and dash line 100 in this figure.

In order to be able to change gears with the engine and propeller turning at high speed and not damage the cooperating splines on the shiftable member 20 and the sun gears 32 and 34, the actual engagement of the splines must take place quickly and when both parts are moving at substantially the same speed. Accordingly, means are provided to arrest the movement of the Belleville washer in its slightly over deadcenter positions, one of which positions is shown in Fig. 1, and to permit a very rapid engagement of the clutch teeth under the snap action of the Belleville spring when the relative speeds of the engaging parts is substantially zero.

The plungers 22 previously referred to are a part of the shiftable assembly including member 20 and sleeve portions 18a and 18b and are thus movable with this assembly as the pistons 60 move the Belleville washer into its neutral position, during which movement the member 20 is likewise disengaged from one of the sun gears. Further movement of the spring 78 and sleeve assembly beyond this neutral position is prevented by the engagement of the rounded ends of plungers 22 with one of the annular gates 102 and 103 of a synchromesh mechanism which gates are disposed in confronting relation to opposite ends of these plungers. These gates have an annular series of plunger receiving apertures 104 which in one position of angular adjustment register with the plungers and are suitably beveled at their edges to facilitate the entry of the plungers 22 therein. Furthermore, each of the gates is free to move through a limited angular rotation as determined by a special spline connection with the sleeve part 18 which it surrounds. Thus, as shown in Figs. 2 and 3 the gates 102 and 103 have widely spaced internal splines 106, which enter into the relatively wide inter-spline spaces between external splines 108 on the sleeve 18. The splines 106 and 108 are so spaced that when splines 108 of the sleeve 18a (Fig. 3) are rotated forward through the inter-spline spaces into engagement with splines 106, the plungers 22 are mid-way between apertures 104. When, however, the relative rotation of sleeve 18a and gate 103 changes and splines 108 engage the opposite faces of splines 106, the plungers 22 are then opposite apertures 104 in the gate and, under the bias of the Belleville spring 78, the shiftable member 20 will move with a snap action to effect the engagement of splines 24 and 28. During this movement the ends of the plungers enter the apertures 104. The movement of the gates 102 and 103 by the sun gears 34 and 32 is accomplished by frictional engagement of the inclined faces 110 and 111 of the gates with the correspondingly inclined friction faces 112 and 114 on the sun gears.

In the position of the parts shown in Fig. 1, fluid under pressure has been admitted to cylinders 58 through passage 64 to move the pistons 60 toward their left hand positions in which they are arrested by stops 66. This movement of pistons 60 accomplishes two things. By the engagement of nuts 76 with the Belleville spring washer 78, the latter is moved about its outer periphery as a pivot while its inner periphery moves the shiftable assembly comprising sleeve 18 and clutch member 20 from high gear position in which clutch teeth 24 and 28 are in engagement into the neutral position shown in Fig. 1 in which shafts 10 and 12 are disconnected. Also this movement of pistons 60 to the left causes the spring 78 to be moved toward its flat, deadcenter position indicated by line 100 in which it is stressed, and slightly beyond this dead-center position, as shown in the drawing. In this position it biases the shiftable assembly strongly for further movement to the left.

This further movement of the shiftable assembly is temporarily prevented, however, by the engagement of the left-hand ends of plunger 22 with the gate 102 of the synchromesh mechanism, as shown in Fig. 2. It wil be evident that at the instant the member 20 is moved out of engagement with sun gear 32 into neutral position, sun gear 34 is rotating faster than member 20, since sun gear 32 and member 20 are rotating at engine speed, while gear 34 is being idly driven, through a higher gear ratio, by the planetary pinions. Consequently, gear 34, by reason of its frictional engagement with gate 102 at 112 will cause the gate 102 to overrun the sleeve 18b through a small angle determined by the inter-spline spaces between splines 106 and 108, as shown in Fig. 2. While gate 102 and sleeve 18b are thus rotating in the same direction, a reversal of their relative rotation is effected by speeding up the engine, by throttle action, and when the member 20 passes through zero velocity relative to the gate 102, the pins 22 will register with holes 104. A rapid engagement takes place when this synchronized speed is reached, the Belleville spring 78 moving the shiftable member with a snap action into the low gear position in which clutch teeth 26 and 30 are in mesh.

The operation when shifting from low to high gear is essentially the same. It will be noted, however, that in this instance the shiftable member 20 is rotating faster than sun gear 32 with which the clutch teeth 24 are to be engaged. Consequently, the splines 108 are overrunning splines 106 so that the shift will take place when the engine speed is decreased.

In practice the shift from either gear to the other is accomplished without any particular thought by the pilot as to the operation of the synchromesh mechanism by intermittently depressing the throttle a few times until the shift occurs.

Usually the propeller is provided with a speed governor for controlling the speed of the propeller by changing the pitch of the blades so that the speed of gears 32 and 34, during shift, will remain constant at any predetermined setting, gear 34 rotating substantially faster than gear 32.

As shown, the Belleville spring does not move to its completely relaxed positions, represented by lines 96 and 98, when the parts are in high and low gear positions. Instead the spring is again arrested by engagement of the clutch teeth in order that it may continue to exert a holding pressure against the shiftable member to retain the clutch parts in engagement. This, however, may vary with different gear mechanisms.

As a result of this improved structure it will be evident that a two-speed gearing has been provided which enables shifting from either gear to the other while the engine driven and propeller shafts are turning at high speed without injury to the gearing. It wil also be evident that improved actuating means for effecting the shift is provided by which the initial movement of a resilient actuating member to stressed position is accomplished during shifting of the shiftable member to neutral position, while an improved snap actuation of the shiftable member is provided at the instant the relative speed of the engageable members goes through zero. A further advantage of the improved construction resides in the fact that this snap actuation takes place free from restraint of the operating mechanism.

While I have illustrated a preferred embodiment of the invention, it is to be understood that various changes may be made in the construction and disposition of the parts without departing from the scope of the following claims. For example, while only one Belleville washer has been shown, it will be obvious that if a greater shifting force is desired, a series of such Belleville washer may be arranged to actuate the shiftable assembly.

I claim:

1. A shifting mechanism having a shiftable member reciprocable between two end positions, a Belleville washer having an inner periphery and an outer periphery, means for fixing one periphery of said washer against axial movement, means for connecting the other periphery of said washer to said shiftable member, whereby said washer when it moves in either direction into an end position from a dead-center position will cause said shifting means to be moved in the same direction with a snap action into one of its end positions, and actuating means including hydraulically operated pistons arranged in a circle concentric with the axis of said Belleville washer for moving said washer from either end position thereof through and slightly beyond a dead-center position, said pistons having a lost motion connection with said washer permitting said washer to snap into either end position free from said actuating means.

2. A shifting mechanism having a shiftable member movable between two end positions, a Belleville washer having an inner periphery and an outer periphery, means for fixing one periphery of said washer against axial movement, means for connecting the other periphery of said washer to said shiftable member, whereby said washer when it moves in either direction into an end position from a dead-center position will cause said shifting means to be moved in the same direction with a snap action into one of its end positions, and actuating means including hydraulically operated pistons arranged in a circle concentric with the axis of said Belleville washer for moving said washer from either end position thereof through and slightly beyond a dead-center position, said washer having an aperture between its inner and outer periphery for each piston, each of said pistons having a lost motion connection with said washer permitting said washer to snap into a position free from said actuating means, each of said lost motion connections including a rod connected to its piston and extending through the associated aperture, said rod being provided with spaced stops on opposite sides of said aperture.

3. In a driving mechanism, a driving shaft, a driven shaft coaxial thereto, shifting means movable between two end positions for connecting said shafts, a Belleville washer coaxial with said shafts having an inner periphery and an outer periphery, means for fixing one periphery of said washer against axial movement, means for connecting the other periphery of said washer to said shifting means, whereby said washer when it moves in either direction into an end position from a dead-center position will cause said shifting means to be moved in the same direction with a snap action into one of its end positions, and actuating means including hydraulically operated pistons arranged in a circle concentric with the driving shaft for moving said washer from either end position thereof through and slightly beyond a dead-center position, each of said pistons having a lost motion connection with said washer permitting said washer to snap into its other end position free from said actuating means.

4. In a driving mechanism, a driving shaft, a driven shaft coaxial thereto, shifting means movable between two end positions for connecting said shafts, a Belleville washer coaxial with said shafts having an inner periphery and an outer periphery, means for fixing one periphery of said washer against axial movement, means for connecting the other periphery of said washer to said shifting means, whereby said washer when it moves in either direction into an end position from a dead-center position will cause said shifting means to be moved in the same direction with a snap action into one of its end positions and actuating means including hydraulically operated pistons arranged in a circle concentric with the driving shaft for moving said washer from either end position thereof through and slightly beyond a dead-center position, said washer having apertures between its inner and outer periphery, each of said pistons having a lost motion connection with said washer permitting said washer to snap into its other end position free from said actuating means, each of said lost motion connections including a rod connected to its piston and extending through the associated aperture, said rod being provided with spaced stops on opposite sides of said aperture.

ALEXANDER H. KING.

REFERENCES CITED

The following references are of record in the file of this patent:

UNITED STATES PATENTS

| Number | Name | Date |
|---|---|---|
| 1,520,734 | Turney | Dec. 30, 1924 |
| 1,773,699 | Wasbaver | Aug. 19, 1930 |
| 1,813,801 | Haynes | July 7, 1931 |
| 2,080,079 | Johnson | May 11, 1937 |
| 2,092,580 | Kelley | Sept. 9, 1937 |
| 2,100,464 | Almen et al. | Nov. 30, 1937 |
| 2,118,792 | Horton | May 24, 1938 |
| 2,211,191 | Wolfram | Aug. 13, 1940 |
| 2,356,598 | Lang | Aug. 22, 1944 |
| 2,380,677 | Schjolin | July 31, 1945 |
| 2,413,675 | Baker | Jan. 7, 1947 |

FOREIGN PATENTS

| Number | Country | Date |
|---|---|---|
| 680,351 | Germany | Aug. 26, 1939 |